Patented June 12, 1951

2,556,222

UNITED STATES PATENT OFFICE 2,556,222

DRILLING FLUIDS AND METHODS OF USING SAME

Virgil Scarth, Bartlesville, Okla., assignor to Phillips Petroleum Company, a corporation of Delaware No Drawing. Application September 16, 1947, Serial No. 774,420

8 Claims. (Cl. 252—8.5)

This invention relates to water base drilling muds containing a water soluble salt of a carboxyalkyl oxycellulose ether selected from the group consisting of the alkali metal and ammonium salts of carboxymethyl oxycellulose ether and the alkali metal, the alkaline earth metal and the ammonium salts of alpha carboxyethyl and beta carboxyethyl oxycellulose ethers. In some aspects, it relates to drilling muds suitable for use in heaving shale formations. In another aspect it relates to drilling muds having a high salt content either due to deliberate addition or to contamination from the formations penetrated. In still another aspect, it relates to methods of drilling or controlling wells with such fluids.

In the art of drilling muds by the rotary method, it is necessary to use a drilling mud as is well understood in the art. This drilling mud must carry the cuttings to the surface, create a back pressure against the walls of the well to prevent caving and form a difficultly permeable cake on the walls of the well to prevent the loss of at least any substantial amount of water from the drilling mud to the natural formations which the well penetrates. A satisfactory drilling mud must have the lowest viscosity consistent with the capacity for carrying away rock particles. It must have suitable gel properties or thixotropy so that the heavy particles held in the stream do not settle too rapidly when the pump is stopped.

One of the problems encountered in drilling a well is to prevent filtering or seeping of the water from the mud in the stream into the formations penetrated, particularly if these formations are of the heaving shale type. These heaving shales absorb water from the drilling mud and by a caving or swelling action common to bentonitic materials, close the hole around the drill string, choke off the circulation of drilling mud, and seize the drill string so that it twists in half.

Another problem is the encountering of salt or brine waters, which have a high content of sodium or calcium chloride. These brines flocculate the colloidal clay in the mud and cause the viscosity of the mud to increase. Large amounts of electrolytes will cause such an increase in viscosity of the mud that the circulation is stopped and the drill string is seized and twisted off.

Another problem is to keep the viscosity of the drilling mud low enough so that it can be circulated by the pumps and yet high enough to hold the heavy particles in the stream.

Still another problem is to produce a mud with proper thixotropy so that the heavy particles are held in the stream and do not settle too rapidly when the circulation of drilling mud is stopped.

The principal object of my invention is to produce a drilling mud which can be used not only in ordinary formations but which will reduce water loss to formations penetrated so that it can be used in formations of the heaving shale type.

Another object is to produce a drilling mud that will resist the flocculating action of electrolytes encountered in brine waters.

Another object is to provide an improved drilling mud.

Another object is to provide a drilling mud containing in combination, a carboxyalkyl oxycellulose ether and sufficient clayey material to form a filter cake on the wall of the well.

Numerous other objects and advantages of this invention will be apparent to those skilled in the art upon reading the following specification and the accompanying claims.

OPERATIONS

In the present invention, I prefer to employ as a colloidal suspending agent or dispersing agent a water soluble carboxyalkyl oxycellulose ether selected from the group consisting of the alkali metal and ammonium salts of carboxymethyl oxycellulose ether and the alkali metal, the alkaline earth metal and ammonium salts of alpha carboxyethyl and beta carboxyethyl oxycellulose ethers. The amount of such agent used is not critical as even small amounts give corresponding small effects. The amount to be used depends on the formations encountered in the drilling. Each formation presents a distinct problem. However, it has long been customary in rotary well drilling to subject the mud to simple tests from time to time, and these simple tests used in all prior rotary well drilling operations are sufficient to indicate the amount of the agent to be used. An over or under dose of the agent will still be operative but merely does not produce optimum results. I prefer to use my carboxyalkyl oxycellulose ether in the ratio of about 3 pounds air-dried material per 42 gallon barrel of mud. However, more or less of this salt may be used and the advantages of the invention be realized to a greater or less extent. For example, from ½ to 8 lbs. per barrel may be employed under varying conditions so it is preferred to give the real limits of enough to lower the water loss but not enough to increase the viscosity so high that it cannot be circulated by the pumps. The lower limit is the least amount that can be used for the particular formations penetrated and still produce the desired result. There is no definite upper limit aside from pumpability except that the use of more than is necessary is uneconomical. Weighting agents such as barium sulfate may be used in combination with the mud without detrimental effect.

I prefer to use a carboxyalkyl oxycellulose in which the degree of substitution of carboxyl groups is about 0.3 to about 0.8 and the degree of substitution of carboxymethyl groups is about 0.3 to about 0.8 per cellulose unit and which has undergone substantially no degradation, or only a minor degree of degradation, during the oxidation. However, these limits are not critical and beneficial results may be obtained with compounds that fall outside these limits as long as the selected salt is water soluble. A suitable method for producing a carboxymethyl oxycellulose ether is by the action of chloroacetic acid on an oxycellulose which has not been degraded or in which the amount of degradation is negligible. The two carboxyethyl oxycelluloses may be prepared by the reaction of acrylonitrile on the oxidized cellulose followed by hydrolysis.

A suitable method for the preparation of a nondegraded oxycellulose is described in two articles in the Journal of the American Chemical Society, 64, 121 and 127 (1942). The acrylonitrile process for the making of carboxyethylcellulose compounds is fully described in U. S. Patents No. 2,332,048 and No. 2,349,797.

However, any method may be used in the preparation of these carboxyalkyl oxycellulose ethers as long as there is not excessive degradation and the proper degree of oxidation or carboxyalkylation is effected. The method of preparation is not a part of this invention.

The various salts may be made by treating the free acid with a soluble salt of the preferred metal ion, or by any other suitable reaction.

The optimum pH for drilling muds using carboxyalkyl oxycellulose ethers is about 8.0 with the useful range being about 5.0 to 10.5. Desirable effects may, under certain circumstances, be obtained outside this range.

In using the carboxyalkyl oxycellulose ethers, they may be put into solution and the solutions added to the mud. Another method is to add the dry salt to the mud directly. These salts may be added to the mud by any other convenient method as the method of addition is not critical. The use of a salt of carboxyalkyl oxycellulose ether as a soluble dispersing agent throughout the entire normal life of drilling mud is not to be confused with the undesirable use of some alkaline or acid soluble cellulose which is to be precipitated or regenerated as an insoluble plugging agent in the formation which undesirable use depends on the insolubility of the salt in water or on its being easily precipitated or regenerated in neutral or acid water.

The effectiveness of carboxyalkyl oxycellulose ether drilling mud additives depends on the solubility of such salts and on their not being precipitated or regenerated in the well. Such precipitation or regeneration would reduce the concentration and thereby reduce the effectiveness of these salts.

The mode or theory of operation by which the carboxyalkyl oxycellulose ether protects the surface of the bentonite from attack by water is obscure, but it is believed that as the water attempts to enter the clay the carboxyalkyl oxycellulose ether forms a layer of protective material on the outside of the clay or bentonite, inhibiting the clay or bentonite from absorbing the water from the drilling mud.

Drilling muds containing carboxyalkyl oxycellulose ethers may be employed where there is a high concentration of soluble calcium or salt.

Drilling muds containing carboxyalkyl oxycellulose ethers often have low initial gel strength, which allows the gas bubbles to come out of the drilling mud so rapidly that the drilling mud does not become gas cut. Elimination of gas cutting reduces the chances of blowouts. Carboxyalkyl oxycellulose ether drilling muds are often characterized by their thin filter cake thicknesses, and by small water loss. This is very useful in avoiding loss of water to the formation and the resulting swelling or caving of the formation which occurs with some formations.

Drilling muds containing carboxyalkyl oxycellulose ether do not generally ferment or spoil.

Numerous other advantages of carboxyalkyl oxycellulose ether drilling muds will be apparent from a study of the following representative tests which have been selected to show in a minimum of space the advantages of such muds.

EXAMPLE A

A sample of the sodium salt of carboxymethyl oxycellulose ether used in these tests was prepared in the following way. 120 grams of 11.4 per cent oxycellulose (11.4% carboxyl content) was dissolved in a caustic solution of 660 grams of sodium hydroxide in 1598 grams of distilled water. After the solution had stood for 5 hours, it was cooled to 54° F. and a solution of 648 grams of chloroacetic acid in 180 ml. of water was slowly added with stirring to the cool basic oxycellulose. The reaction mixture was allowed to stand at room temperature for 24 hours.

The sodium carboxymethyl oxycellulose ether was precipitated by pouring the solution into methyl alcohol. The precipitate was filtered and washed with acetone. The precipitate was then dissolved, precipitated with methyl alcohol and washed with acetone. This procedure was repeated three more times and finally, the precipitate was washed several times with absolute ethyl alcohol and dried in an oven at 110° F. The sodium carboxymethyl oxycellulose ether was a white, fluffy material, readily soluble in water.

It was determined by analysis that, for the sodium carboxymethyl oxycellulose ether, the degree of carboxymethyl substitution was 0.56 carboxymethyl groups per cellulose unit, and the degree of carboxyl substitution was 0.45.

EXAMPLE B

A 1 per cent aqueous solution of the sodium carboxymethyl oxycellulose ether from A was prepared and it was found to dissolve completely so that no insoluble material settled out in 5 minutes of centrifuging. The viscosity at 20° C. was 1.0 c. p. s. and the pH was 5.5.

EXAMPLE C

Three samples of mud of the following composition were prepared for admixture with the sodium carboxymethyl oxycellulose ether from A. The weight ratios were 10 lbs. of Ezmix, a native Texas clay containing a high content of soluble calcium to 1 lb. of bentonite. The content of soluble calcium was reduced for the "Low calcium" mud by the addition of barium carbonate. For the salt water mud, the liquid phase was about 50% saturated with salt.

TABLE I

*Composition of muds used*

| Mud Designation | Ezmex[1] | Bentonite | BaSO4 | BaCO3 | NaCl | H2O |
|---|---|---|---|---|---|---|
| | Per Cent | Per Cent | Per Cent | Per Cent | Per Cent | Per Cent |
| Low Calcium | 8.10 | 0.80 | 26.30 | 0.80 | | 64.00 |
| High Calcium | 8.80 | 0.90 | 26.30 | | | 64.00 |
| High Calcium-Salt Water | 7.82 | 0.80 | 23.38 | | 11.00 | 57.00 |

[1] A native Texas clay containing soluble calcium minerals.

Dosages of material tested were equivalent to 0, 1, 2, 4 and 6 lbs. of sodium carboxymethyl oxycellulose ether per barrel of mud. The requisite amount of additive was dissolved in 50 ml. of water and allowed to stand overnight. The hydrated sample was then added to 250 ml. of mud, stirred for 30 minutes on a high speed mixer and then tested for viscosity, gel strengths and water losses according to the procedures set forth in A. P. I. Code 29. The following results were obtained. It will be noted that these muds are characterized by a low stable viscosity with varying amounts of the carboxymethyloxycellulose ether.

TABLE II

[Low calcium]

| Dosage, lbs. per barrel | 0 | 1 | 2 | 4 | 6 |
|---|---|---|---|---|---|
| Viscosity, cps | 15 | 8.5 | 6 | 9 | 10.5 |
| Initial gel, gms | 25 | 0 | 0 | 0 | 0 |
| 10 min. gel, gms | 35 | 15 | 12 | 15 | 10 |
| 30 min. water loss, ml | 28 | 21 | 18 | 17 | 14.5 |
| pH of filtrate | 9 | 7.5 | 8.5 | 9 | 9 |

TABLE III

[High calcium (calcium=1950 p. m. m.)]

| Dosage, lbs. per barrel | 0 | 1 | 2 | 4 | 6 |
|---|---|---|---|---|---|
| Viscosity, cps | 19 | 10 | 7 | 11.5 | 7 |
| Initial gel, gms | 27 | 4 | 2 | 0 | 0 |
| 10 min. gel, gms | 40 | 20 | 15 | 10 | 15 |
| 30 min. water loss, ml | 55 | 45.5 | 40 | 32 | 25 |

TABLE IV

[High calcium (chloride 96,900 p. p. m.—about 50% saturated)]

| Dosage, lbs. per barrel | 0 | 1 | 2 | 4 | 6 |
|---|---|---|---|---|---|
| Viscosity, cps | 21.5 | 18.5 | 15 | 6.5 | 4 |
| Initial gel, gms | 29 | 17 | 13 | 6 | 2 |
| 10 min. gel, gms | 40 | 30 | 20 | 20 | 25 |
| 30 min. water loss, ml | 55 | 53 | 50 | 42 | 41 |
| pH of filtrate | 7.8 | 8.0 | 8.3 | 8.2 | 7.8 |

If samples of drilling muds containing starch and other samples containing my water-soluble salts of carboxyalkyl oxycellulose ethers were prepared and some of each were contaminated with sour mud (fermented mud) while the others were merely exposed to the air, the starch-containing muds would all ferment and become sour within a period of a few days. The contaminated ones would ferment almost at once, and the uncontaminated ones would require a few days. None of the muds containing the carboxyalkyl oxycellulose ethers would ferment regardless of contamination or exposure to air. My drilling fluids are considerably more resistant to attack by organisms than starch-containing muds.

My drilling fluids are entirely compatible with the chemicals ordinarily used in drilling operations. For example, caustic soda, phosphates, and quebracho do not have any adverse effect on my carboxyalkyl oxycellulose additives.

The alkaline earth metals are enumerated differently in different periodic tables, but in drilling mud the grouping in J. W. Mellor's Modern Inorganic Chemistry (1939), Longmans, Green & Co. (revised and edited by G. D. Parkes), page 118 which lists as alkali metals, group IA, lithium, sodium and potassium, and as alkaline earth metals, group IIA, magnesium, calcium, strontium and barium, is considered the best and is relied on in this invention.

Tests with alkali metal and ammonium carboxyalkylcellulose ethers and oxycelluloses show that in all major mud qualities, the alkali metal salts and the ammonium salts are substantially equivalents. The same is true for alkaline earth metal salts when carboxyethylcellulose or oxycellulose is involved. From this it is obvious that the corresponding salts of carboxyalkyl oxycellulose ethers are substantial equivalents.

While this is the preferred embodiment of my invention and one which has special advantages, other metallic salts of carboxyalkyl oxycellulose ethers which are soluble in water or weak alkaline solutions may be employed.

It is to be understood that any theory of operation advanced herein is not presented as being the only or necessary one, but has been advanced only to facilitate the disclosure. It is understood also that this invention is not limited to any theory of operation or action. It is further obvious that various changes may be made in the details without departing from the spirit of this invention or from the scope of the invention as described in the following claims.

Having fully described my invention, I claim:

1. A water base drilling mud comprising, in combination, sufficient water to maintain the mud as a fluid, sufficient clayey material to form a filter cake on the wall of a well and a water-soluble carboxymethyl oxycellulose ether having an average degree of substitution of 0.3 to 0.8 carboxy group and of 0.3 to 0.8 carboxymethyl group per C6 cellulose unit and being selected from the group consisting of the alkali metal and ammonium salts of said carboxymethyl oxycellulose ether in an amount within the range from one-half to 8 pounds of said ether per 42 gallon barrel of said mud, said mud being characterized by a low stable viscosity with varying amounts of said ether.

2. A water base drilling mud comprising, in combination, sufficient water to maintain the mud as a fluid, sufficient clayey material to form a filter cake on the wall of a well and a water-soluble sodium carboxymethyl oxycellulose ether having an average degree of substitution of 0.3 to 0.8 carboxy group and of 0.3 to 0.8 carboxymethyl group per C6 cellulose unit in an amount within the range from one-half to 8 pounds of said ether per 42 gallon barrel of said mud, said mud being characterized by a low stable viscosity with varying amounts of said ether.

3. A water base well drilling mud comprising an aqueous fluid mixture containing suspended inorganic solids which form a filter cake on the wall of a well and a water-soluble carboxymethyl oxycellulose ether having an average degree of substitution of 0.3 to 0.8 carboxy group and of 0.3 to 0.8 carboxymethyl group per C6 cellulose unit and being selected from the group consisting of the alkali metal and ammonium salts of said carboxymethyl oxycellulose ether in an amount within the range of one-half to 8 pounds of said ether per 42 gallon barrel of said mud, said mud being characterized by a low stable viscosity with varying amounts of said ether.

4. A water base drilling mud comprising an aqueous fluid mixture containing suspended inorganic solids which form a filter cake on the wall of a well and a water-soluble alkali metal salt of carboxymethyl oxycellulose ether having an average degree of substitution of 0.3 to 0.8 carboxy group and of 0.3 to 0.8 carboxymethyl group per $C_6$ cellulose unit in an amount within the range of one-half to 8 pounds of said ether per 42 gallon barrel of said mud, said mud being characterized by a low stable viscosity with varying amounts of said ether.

5. A water base well drilling mud comprising an aqueous fluid mixture containing suspended inorganic solids which form a filter cake on the wall of a well and a water-soluble sodium carboxymethyl oxycellulose ether having an average degree of substitution of 0.3 to 0.8 carboxy group and of 0.3 to 0.8 carboxymethyl group per $C_6$ cellulose unit in an amount within the range of one-half to 8 pounds of said ether per 42 gallon barrel of said mud, said mud being characterized by a low stable viscosity with varying amounts of said ether.

6. In a process for drilling a well with well drilling tools wherein there is circulated in the well a water base drilling mud containing colloidal particles of clayey material suspended in sufficient water to render the same circulatable, the method of forming a filter cake on the wall of said well to decrease the loss of fluid from said drilling mud contained therein into surrounding earthen formations while maintainig the viscosity of said mud within a range wherein said mud is circulatable in said well which comprises admixing with said drilling mud and interacting therewith a water-soluble carboxymethyl oxycellulose ether having an average degree of substitution of 0.3 to 0.8 carboxy group and 0.3 to 0.8 carboxymethyl group per $C_6$ cellulose unit and being selected from the group consisting of the alkali metal and ammonuim salts of said carboxymethyl oxycellulose ether in an amount within the range from one-half to 8 pounds per 42 gallon barrel of said mud and contacting said wall of said well with the resulting drilling mud to form said filter cake thereon.

7. In a process for drilling a well with well drilling tools wherein there is circulated in the well a water base drilling mud containing colloidal particles of clayey material suspended in sufficient water to render the same circulatable, the method of forming a filter cake on the wall of said well to decrease the loss of fluid from said drilling mud contained therein into surrounding earthen formations while maintaining the viscosity of said mud within a range wherein said mud is circulatable in said well which comprises admixing with said drilling mud and interacting therewith a water soluble alkali metal salt of carboxymethyl oxycellulose ether having an average degree of substitution of 0.3 to 0.8 carboxy group and of 0.3 to 0.8 carboxymethyl group per $C_6$ cellulose unit in an amount within the range of one-half to 8 pounds of said ether per 42 gallon barrel of said mud and contacting said wall of said well with the resulting drilling mud to form said filter cake thereon.

8. In a process for drilling a well with well drilling tools wherein there is circulated in the well a water base drilling mud containing colloidal particles of clayey material suspended in sufficient water to render the same circulatable, the method of forming a filter cake on the wall of said well to decrease the loss of fluid from said drilling mud contained therein into surrounding earthen formations while maintaining the viscosity of said mud within a range wherein said mud is circulatable in said well which comprises admixing with said drilling mud and interacting therewith a water soluble sodium carboxymethyl oxycellulose ether having an average degree of substitution of 0.3 to 0.8 carboxy group and of 0.3 to 0.8 carboxymethyl group per $C_6$ cellulose unit in an amount within the range of one-half to 8 pounds of said ether per barrel of said mud and contacting said wall of said well with the resulting drilling mud to form said filter cake thereon.

VIRGIL SCARTH.

REFERENCES CITED

The following references are of record in the file of this patent:

UNITED STATES PATENTS

| Number | Name | Date |
|---|---|---|
| 2,129,913 | Cross et al. | Sept. 13, 1938 |
| 2,417,235 | Cannon | Mar. 11, 1947 |
| 2,425,768 | Wagner | Aug. 19, 1947 |
| 2,468,792 | Wagner et al. | May 3, 1949 |